US005838165A

United States Patent [19]
Chatter

[11] Patent Number: 5,838,165
[45] Date of Patent: Nov. 17, 1998

[54] HIGH PERFORMANCE SELF MODIFYING ON-THE-FLY ALTERABLE LOGIC FPGA, ARCHITECTURE AND METHOD

[76] Inventor: Mukesh Chatter, 6 Gina Dr., Hopkinton, Mass. 01748

[21] Appl. No.: 700,966

[22] Filed: Aug. 21, 1996

[51] Int. Cl.[6] .......................... H03K 19/173; H03K 7/38
[52] U.S. Cl. ................................. 326/38; 326/40; 326/39
[58] Field of Search .................. 365/236; 326/38–41

[56] References Cited

U.S. PATENT DOCUMENTS

| | | | |
|---|---|---|---|
| 4,831,573 | 5/1989 | Norman | 326/39 |
| 4,940,909 | 7/1990 | Mulder et al. | 326/38 |
| 5,375,086 | 12/1994 | Wahlstrom | 326/40 |
| 5,426,378 | 6/1995 | Ong | 326/38 |
| 5,469,003 | 11/1995 | Kean | 326/38 |
| 5,488,582 | 1/1996 | Camarota | 365/51 |
| 5,581,198 | 12/1996 | Trimberger | 326/38 |
| 5,646,544 | 7/1997 | Iadanza | 326/38 |

FOREIGN PATENT DOCUMENTS

| | | | |
|---|---|---|---|
| 62-269420 | 11/1987 | Japan | 326/38 |
| 62-269422 | 11/1987 | Japan | 326/38 |

*Primary Examiner*—Michael J. Tokar
*Assistant Examiner*—Richard Roseen
*Attorney, Agent, or Firm*—Rines and Rines

[57] ABSTRACT

A technique for configuring arrays of programmable logic cells, including those associated with FPGA devices, through a novel DRAM-based configuration control structure that enables not only "on-the-fly" alterable chip and similar device reconfigurations, but, where desired, self-modifying reconfigurations for differing functionalities of the devices, eliminating current serious reconfigurability limitations and related problems, while providing significantly enhanced system performance at low cost. A large amount of memory is available internal to the FPGA and is accessed with a small number of pins such that the reconfiguration time is, for example, four orders of magnitude faster than the traditional approaches and at notably low cost.

24 Claims, 6 Drawing Sheets

HIGH PERFORMANCE SELF MODIFYING ON-THE-FLY ALTERABLE LOGIC FPGA, ARCHITECTURE AND METHOD

The present invention relates to reconfigurable computing, being more particularly, though not exclusively concerned with field programmable gate array (FPGA) and similar architectures.

BACKGROUND OF INVENTION

Reconfigurable gate arrays, also known as field programmable gate arrays (FPGA), are widely used in the industry to implement a variety of digital circuits. The application areas include computers, workstations, control systems, etc. A typical traditional FPGA device contains a number of logic cells which are configured to meet the specific design requirements. An unprogrammed FPGA contains a predefined logic cell structure as later described. Each of these said cells is configured to perform a specific task (a logical circuit) to achieve the desired functionality. The programming information is generally loaded serially into the FPGA as a relatively slow process (some devices are loaded via 8 bits wide bus, still a very slow process), where it is retained internally so long as power is applied to the device, by the configuration storage elements typically implemented as distributed static RAM (SRAM). The device can also be reconfigured while the power is on by following a predefined programming sequence which includes the before-described slow serial loading of the reconfiguration data. As an example, Xilinx Corporation's device XC4025, a traditional FPGA, requires 422,128 bits of programming information and takes nearly 42 ms to completely program (or reconfigure) the device. As the device size gets larger, this delay gets bigger.

For some applications, where FPGAs are programmed only once at power up and the reconfigurability is not an issue, this rather huge configuration time is generally acceptable. But, it fails to satisfy the requirements of some other applications where performance can be significantly improved, if reconfiguration time is substantially reduced. This problem is prevalent among all types of applications, including real time simulation, coprocessor, digital signal processing and various other algorithms, etc.

The invention is designed to eliminate current reconfiguration limitations and related problems and provide significantly enhanced system performance and at reduced cost, enabling substantially universal usage for many applications as a result of providing on-the-fly alterable chip or other logic architecture.

Vast numbers of such system designs, especially in high speed computers and workstations, are performance-limited for certain classes of applications such as simulation, due to the fixed structure of the functional units, which severally retards performance of any operations outside their specific domains. These problems are best resolved with an "on-the-fly" reconfigurability, but they have remained unsolved due to the time required for reconfiguration.

Thus the availability of a low cost, high performance machine for some widely used applications requiring dynamically reconfigurable logic has largely remained elusive, that is, until the advent of the present invention that now provides an innovative self modifying on-the-fly reconfigurable FPGA architecture, eliminating these problems and thus providing considerably enhanced performance, at notably lower cost.

While illustrative simulation and coprocessor applications are presented hereafter as examples for better understanding of these problems, and the manner in which the invention overcomes them, the invention is in no way to be considered as limited to these exemplary areas only.

A Simulation Application Example

A big digital integrated circuit design is simulated prior to its expensive and time consuming fabrication cycle to maximize its chances of correct functioning after fabrication. The design is extensively checked on high performance engineering workstations against all possible input conditions by providing stimulus and observing the response. If the response does not meet the expected results, the design is checked for correctness. This iterative process is continued until all possible scenarios have been verified. Simulation is extremely time consuming, expensive and increases the time to market, but this problem is a critical part of the design methodology and is currently managed by splitting the large simulation tasks among a number of engineers and then compiling the results—a very error prone process, though it does speed up the task at substantially higher cost. The recent fiasco with the Intel Pentium microprocessor floating point unit is a case in point.

As an example, consider a new high speed functional unit, designed to add two 32 bit numbers in two clock cycles, for a next generation CPU. Its software-based gate level simulation will take thousands of clock cycles on a high speed workstation. When multiple operation cycles need be verified for such new functional unit designs, the resulting delay, orders of magnitude worse than the actual designed operation, consumes considerable time of the overall simulation.

Another approach to this problem has been 'design emulation' (described, for example, in QuickTurn Corporation's emulation brochures), where a design is mapped onto a large number of traditional FPGAs, connected via external hardware, and is run in real time at much slower speed than the speed of operation. This emulation equipment is extremely expensive, requires a long time to set up for each emulation cycle, and some times can not even map the actual design at all, hence not widely used.

A Computing Application Example

Consider for illustrative background purposes, a computing application example where a complex iterative 64 bit multiplication functionality is to be followed by an additional functionality, and to be performed by a 32 bit CPU for 1024 samples. As the CPU does not have a dedicated functional unit to perform this task, it is split into various sub tasks including a multi-step 32 bit implementation of 64 bit multiplication and the result is added to another 64 bit number by executing multiple 32 bit additions. The process is repeated 1024 times. Clearly this execution consumes a significant amount of CPU time, thereby substantially reducing the performance.

It is to the effective solution of these and similar pressing problems, indeed, that the present invention is directed, the invention being believed to be a breakthrough in the evolution of a new type of FPGA and related architecture and method that:

a. provides on-the-fly reconfigurability with architectural innovations rather than sheer device speeds;
b. provides self-modifying capability to allow for efficient high speed pipelined implementations;
c. stores large number of configurations internal to the chip;
d. provides low pin count for the functionality provided;
e. provides reasonable low cost due to reduction in number of pins; and
f. provides a simple system interface to minimize the design effort.

OBJECTS OF INVENTION

An objective of the invention, accordingly, is to provide a new and improved dynamically reconfigurable gate array system, architecture and method utilizing a novel DRAM-based configuration control structure that obviates current reconfigurability limitations including those above described, and related problems, while providing significantly enhanced system performance at low cost, and which thereby enable substantially universal usage for myriads of applications.

Another object is to provide a method and apparatus to self modify the logic implementation based on pre-determined criteria.

A further object is to provide such a novel system in which a large amount of memory is available internal to the FPGA and is accessed with a small number of pins, such that the reconfiguration time is 4 orders of magnitude faster than the traditional approaches, and at notably low cost.

Still another object is to provide a system based on this novel architecture that works equally efficiently in both non-reconfiguration and reconfiguration applications.

Other and further objectives will be explained hereinafter and are more particularly delineated in the appended claims.

SUMMARY

In summary, from one of the broader viewpoints, the invention enhances a method of configuring an array of programmable logic cells each having logic functions controlled by an associated configuration bit memory, that comprises, storing bit information defining multiple program configurations in a DRAM core; connecting a bus to the array to enable a DRAM row wide loading of the configuration bit memories of the cells with bit information defining a desired configuration; and, upon a configuration command, retrieving from the DRAM core, at least a row at a time, the configuration bit information, and loading such information in the bit memories of the cells to control the corresponding cell logic functions to achieve the desired configuration programming.

Preferred and best mode designs and techniques are hereafter explained in detail.

DRAWINGS

The invention will now be described in connection with the appended drawings, in which FIGS. 1–3 illustrate prior art techniques as follows:

PREFERRED EMBODIMENT(S) OF THE INVENTION

It is now in order to describe the invention for eliminating the reconfiguration delay and other previously described bottlenecks in accordance with its new 'SONAL'-centered solution by dramatically reducing the amount of time spent in reconfiguration of FPGAs, and, where desired, by providing a self modifying mode, thereby allowing functional alteration without external intervention, resulting in much faster execution time. Other benefits include the availability of large memory inside the FPGA, resulting in reduced system cost, as before stated.

Figure 1:
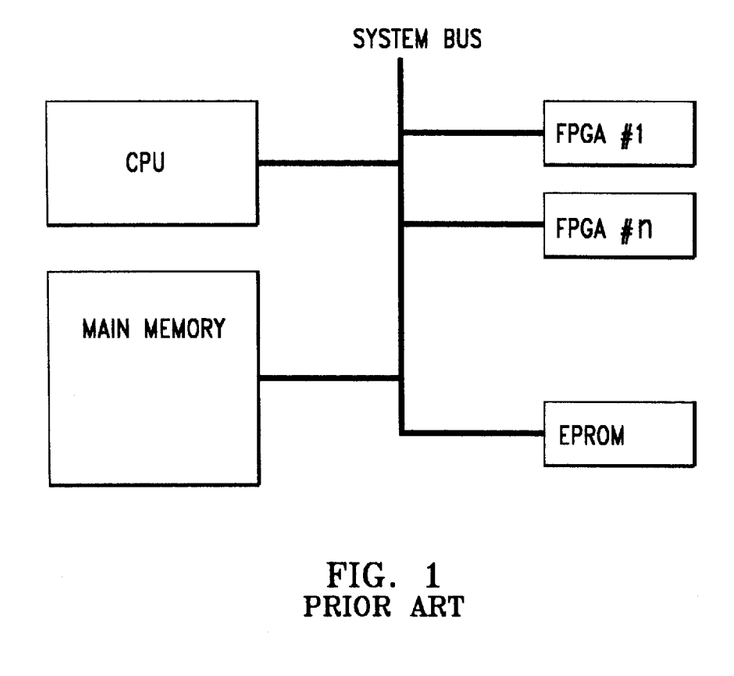
FIG. 1 is a block diagram of a typical prior art FPGA interface.
Figure 2:
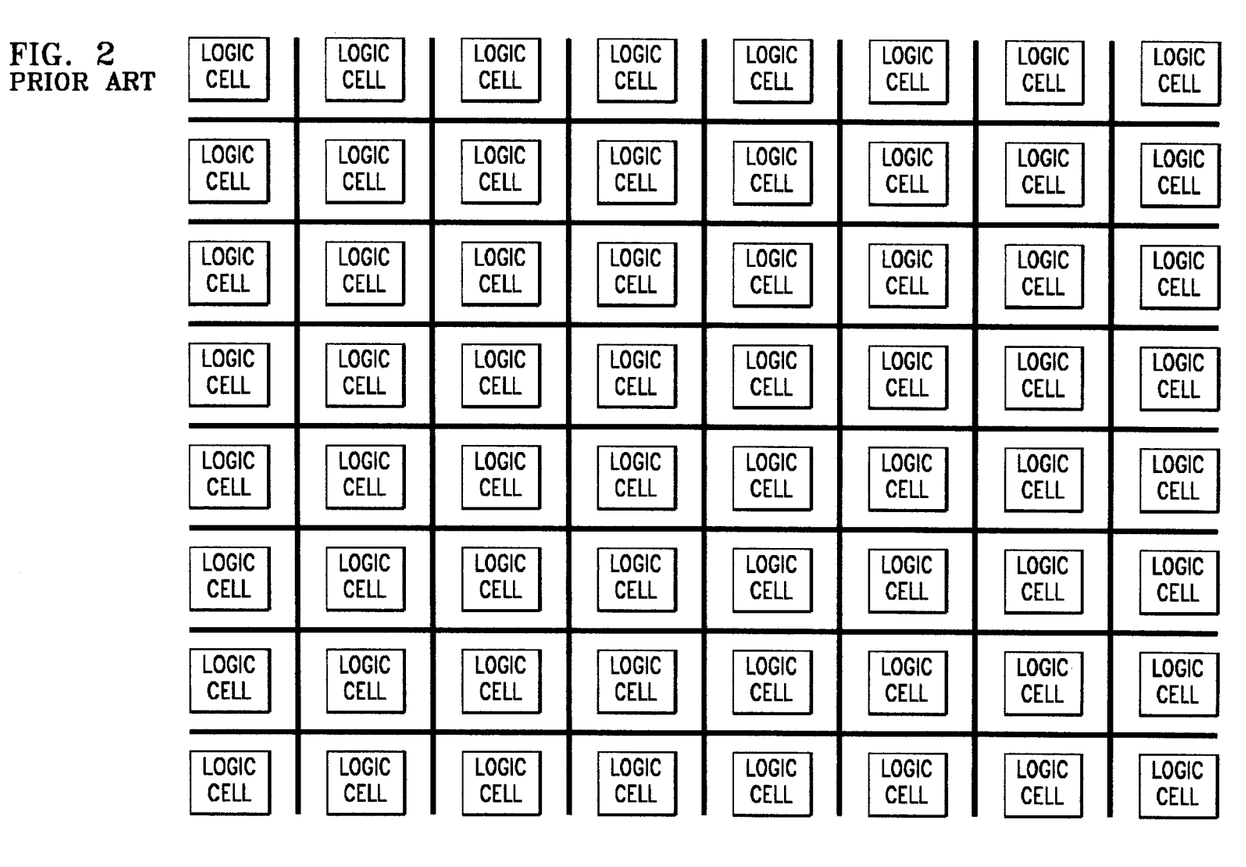
FIG. 2 shows a typical prior art FPGA internal logic cell structure or array and routing channels.
Figure 3:
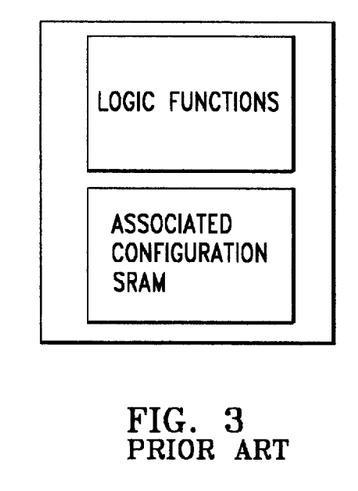
FIG. 3 illustrates a typical prior art configurable logic cell for use in a configuration such as that of FIG. 2.
Figure 4:
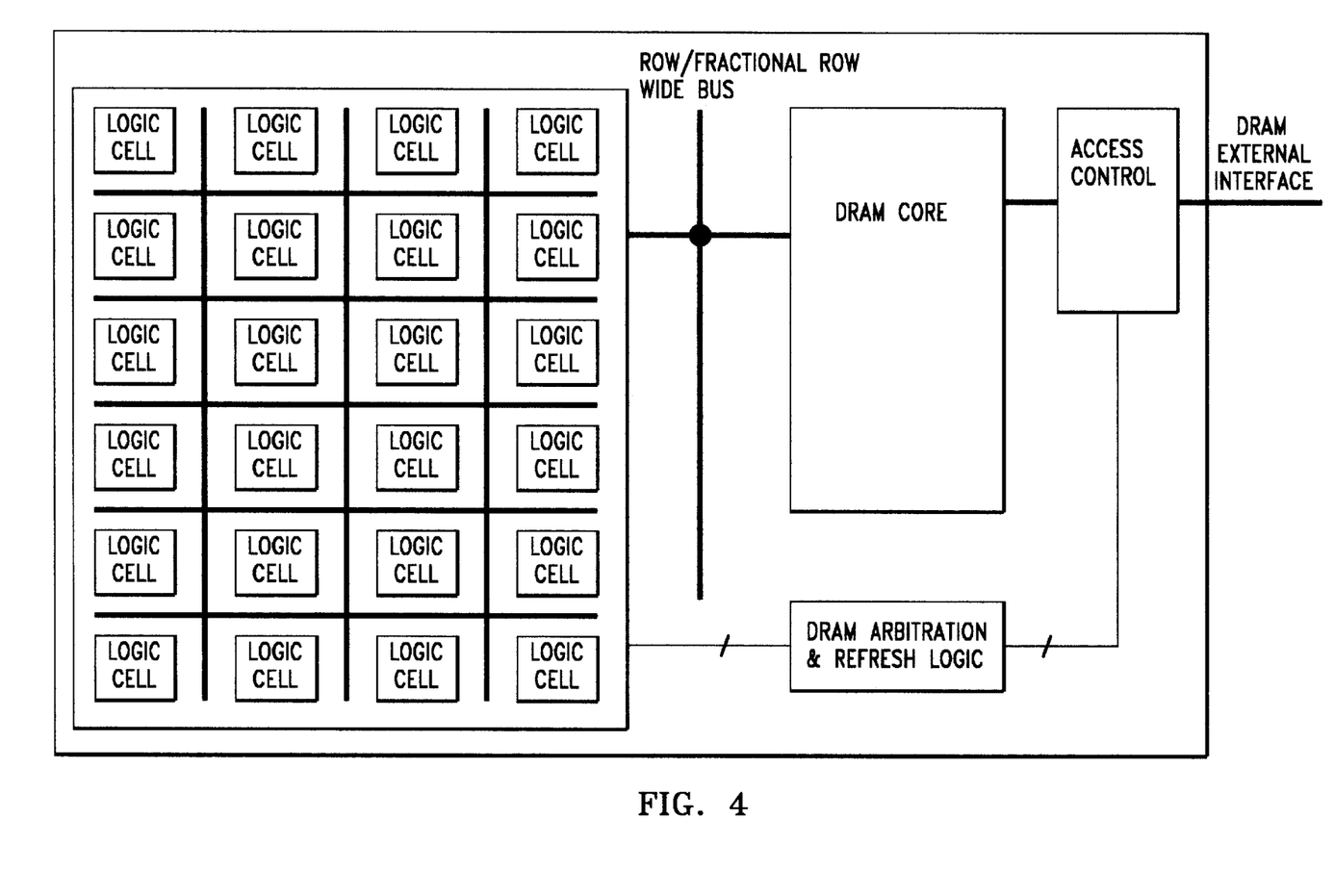
FIG. 4 is a block diagram of a partial top level architecture constructed in accordance with the present invention, termed herein a 'SONAL' architecture, where the term stands for Self-modifying, On-the-fly Alterable Logic.

As before mentioned, FIG. 1 shows the prior art FPGA interface using FPGA units (#1–#n) programmed through a bus system, so-labelled, by a CPU working with main memory. The FPGA units have the internal logic cell structure or array and routing channels of FIG. 2, with each configurable logic cell having logic functions controlled by an associated configuration static RAM (SRAM) as represented in FIG. 3, wherein the configuration data is stored in the small localized internal static RAM bits. In this invention, however, a DRAM core, as shown in FIG. 4, is used to store multiple configurations. The configuration SRAM bits required for the device configuration are also provided. A DRAM row wide bus is provided (where the term "row" as used herein also embraces a part or fraction of a row), which connects directly to the SRAM bits, which then subsequently control the programmable elements. After a configuration command is given, a row is retrieved each time and is stored in the said SRAM bits, until all the necessary configuration storage elements have been loaded. A partial reconfiguration is achieved by only loading those SRAM bits which need be changed. A further enhancement of this invention is to provide masking capability such that only bits which need be changed are allowed to be loaded into configuration SRAM. It is also possible to load new configuration data into the DRAM while the chip is operational. The same DRAM is also usable as storage space accessible from both the external I/O or via the internal logic. From the external interface side, it will have a narrow I/O width data interface, but internally its row wide bus can be used to store/retrieve maximum of a row wide data in one access. Once a row has been selected internally, the capability to access the column data at very high speed makes this an ideal space for state machine usage. It is not necessary to follow the traditional, equal number of rows and columns approach; and in some cases, it may be advantageous to have a structure with considerable bias towards rows as distinguished from columns, to allow for even faster dynamic reconfiguration. The over all functionality can be best illustrated with an example.

Consider a traditional FPGA which requires 32768 bits to configure all its programmable elements and with a maximum serial rate of 10 Mhz, at which it can be reconfigured. The reconfiguration time is then roughly 3.3 ms. Assume that a corresponding 'SONAL' contains a 256K×8 DRAM core as part of its architecture as shown in FIG. 4. Wherein an access control circuit, so-labelled, is connected to input the DRAM core and is also connected to a DRAM arbitration and/or refresh logic module, also so-labelled, responsive to a configuration command internally emanating from the array of logic cells shown to the left on the figure, and with this assembly connecting to an external DRAM interface, shown at the far right. After receiving the reconfiguration command, a row containing 4096 bits (512 bits per row×8 bits wide) is retrieved in the 'SONAL' FPGA and is stored in corresponding configuration SRAM bits. This row retrieval and subsequent storage process is repeated 8 times in this example to load all the required configuration SRAM bits. If the row retrieval rate is 40 ns, then a total of 320 ns is required completely to reconfigure the FPGA. This is a most significant advantage of the invention over the current-day existing FPGA solutions requiring 3.3 ms. The present invention thus provides an improvement of roughly 4 orders of magnitude over the traditional approach. It should be noted, moreover, that the bus does not have to be a full row wide and can be a fraction of row still herein termed a "row" as before stated, with corresponding reduction in performance.

This fast reconfiguration time of the 'SONAL' can be further improved by incorporating multiple DRAM banks 'm' such that if 'r' rows are required to configure the device and it takes 't' nano seconds to retrieve a row, then:

Configuration time=$r \times t/m$.

One reason to have configuration SRAM bits is the refresh requirement of the DRAM core. It is certainly possible to replace these SRAM bits also by localized DRAM cells, but this is not a preferred solution due to the interference caused by the refresh requirement. Elimination of these bits will reduce the cost and power consumption of the device. An alternate embodiment of this invention involves using two identical banks of DRAMs such that the identical configuration data is loaded in both of them. Assuming that a row provides sufficient data to configure the entire FPGA, then no SRAM bits are required; and when one bank is being refreshed, another one provides the configuration data. The concept can be extended to 'm' banks such that 'm/2' banks have the same configuration information as the other 'm/2' banks.

In one application of this device, a serial stream of multiplexed data can be split among its constituent serial streams, converted to parallel format and simultaneously loaded into a DRAM row at different predetermined column addresses.

In another alternate embodiment of this invention, an internal DRAM bank is used for reconfiguration data only while another internal bank is primarily used for general purpose memory, such that externally both banks are accessed via the same interface to minimize the cost.

Figure 5:
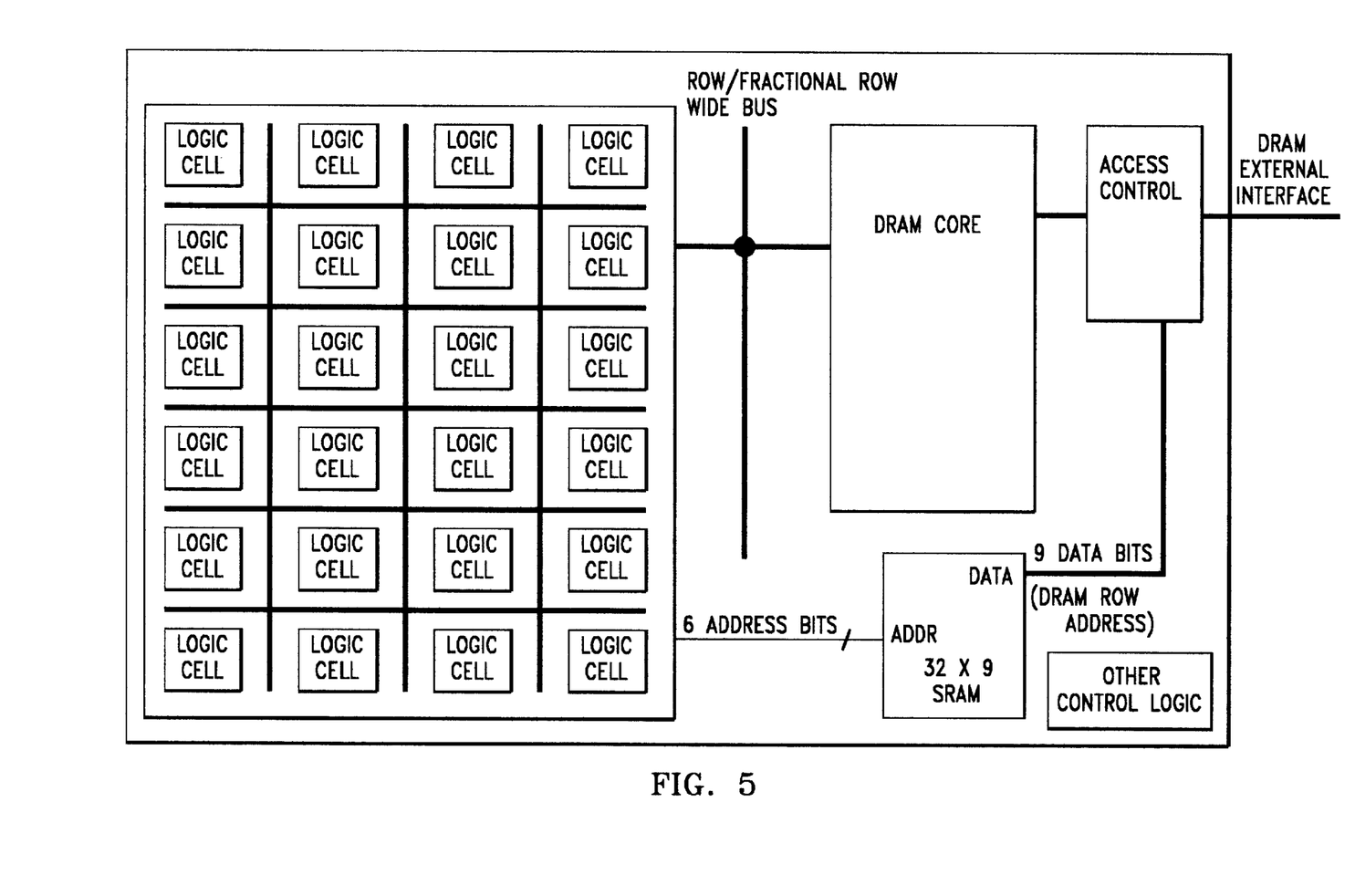
FIG. 5 is a block diagram of such a novel architecture which permits implementation of self modifying logic functions.

In yet another embodiment of this invention, a self-modifying circuit can be designed with one possible implementation shown in FIG. 5. Here, a small SRAM core, with data width equal to the number of bits required to decode each row address uniquely, drives the selected row addresses of the DRAM, internally. The number of SRAM core address locations in this self-modifying architecture is subject to the required depth of the reconfiguration capability. As an example, in this case, it is shown as 32×9 SRAM. There are 5 address bits for this SRAM core, which are driven by the FPGA control logic. In response to a configuration data bit command from the logic cell array or otherwise at the appropriate event or time when certain logic conditions are met, the output of the SRAM core is used to retrieve the row wide configuration data. The new circuit implementation may have different control logic driving the SRAM core address inputs, subject to the state of various circuit elements, resulting in yet another circuit functionality implementation; and so on and so forth, automatically. Thus the chip functionality can be dynamically altered to a predetermined logic implementation subject to the outcome of certain logic conditions. This technique provides a highly efficient self-modifying circuit requiring minimum intervention from the associated CPU, thus enhancing the overall system performance significantly, and has wide ranging applications in digital signal processing algorithms, pipelined designs etc. One potential application is to segment a large pipelined design into multiple configurations and these configurations are loaded as required by the processing hardware. This significantly reduces the number of gates required to implement designs due to reusability of the gates, thereby reducing the chip cost. This is only achievable because of the very high speed "on-the-fly" self-modifying capability.

The SRAM core can also be implemented with other technologies such as Flash or EEPROM.

Figure 6:
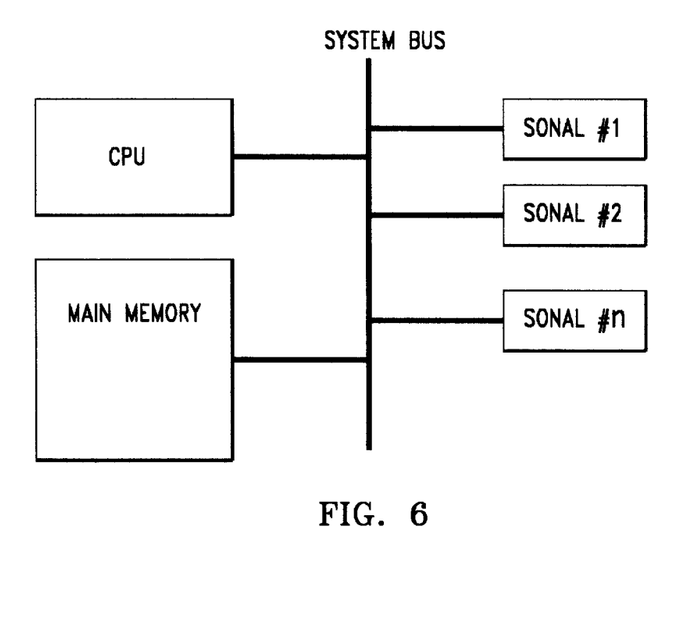
FIG. 6 is a block diagram of a system architecture also constructed in accordance with the present invention and embodying the self-modifying "on-the-fly" alterable logic of the invention termed a 'SONAL' FPGA.

At the system level, multiple such 'SONAL' devices can be connected on the system bus to enhance the capability of the machine as shown in FIG. 6. It should be noted that this on-the-fly approach to reconfigurability or self-modifying circuit is not limited to FPGAs only, and can also be part of a CPU containing similar reconfigurable elements.

Consider, for example, 'JAVA' (the most widely used Internet language) which is specifically designed to be platform independent, thereby providing complete portability among various machines. The disadvantage is that 'JAVA' runs extremely slow as it does not take advantage of unique architectural capabilities of different CPUs. One approach to improve 'JAVA' execution speed is by providing it a common virtual hardware platform (in addition to the traditional CPU functionality), alterable at very high speed. This virtual hardware is implemented either by providing reconfigurability with 'SONAL' capability on CPUs themselves or implemented as a separate 'SONAL' FPGA. This architecture thus retains the key element of platform independence, yet provides higher speed execution.

'SONAL' I/O Interface

Figure 7:
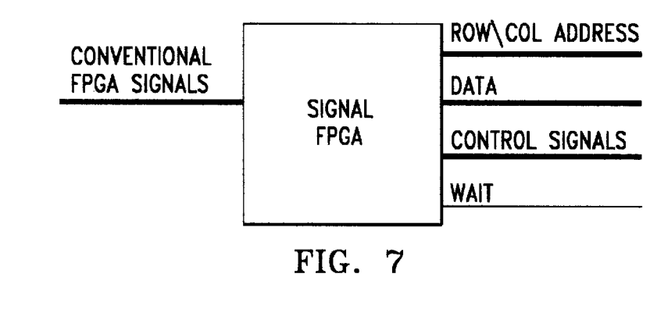
FIG. 7 presents an example of a useful pinout for a 'SONAL' FPGA of the invention.
Figure 8:
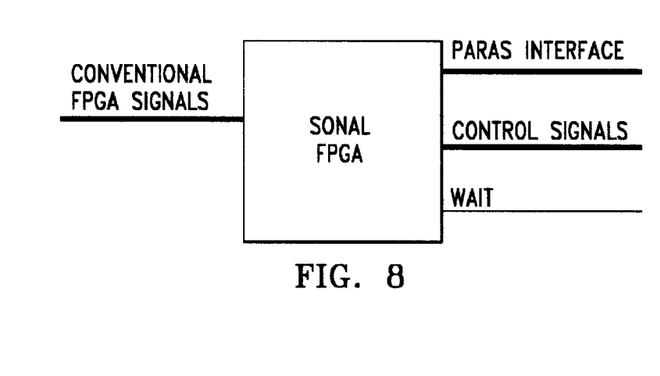
FIG. 8 is modification of the 'SONAL' FPGA of before-mentioned FIG. 7, adapted for use with a so called 'PARAS' interface and access, described in co-pending U.S. patent application Ser. No. 08/320,058, filed Oct. 7, 1994, and with a low pin count integrated memory architecture.

The chip has somewhat different pinout to reflect its unique architecture. One possible pinout is shown exemplarily in FIG. 7, providing a traditional DRAM interface with separate address and data buses. Consider an example of a 'SONAL' with 256K×8 DRAM. Using the traditional DRAM access approach, 21 pins are required (9 for address, 8 for data, 1 each for 'RAS', 'CAS', 'WRITE' and 'Output Enable'). A 'WAIT' signal is also provided for the system bus interface whenever an internal transfer between the FPGA cells and the DRAM core is taking place. The CPU (or other master controller) can either use it to delay the start of access, or in an alternate implementation, the access cycle can be extended to allow for the internal transfer to complete, before proceeding with this access. Further improvement to this invention may be made to reduce the pin count and thus cost, if the interface access mechanism of said copending application, called 'PARAS' DRAM, is used along with the 'SONAL' organization. [This application discloses a method of and apparatus for improving the accessing capability of asynchronous and synchronous dynamic random access memory devices by a novel interfacing and accessing procedure in which the same pins are used for each of row, column and data accessing and in both the read and write cycles; such enabling effectively increasing the data bandwidth and addressing range in substantially the same size packages but with fewer pins.] Using such 'PARAS' model, only 13 pins and one additional for 'WAIT' are needed as shown in FIG. 8. It should be noted, furthermore, that in applications where it is not necessary to access the DRAM after the configuration data has been loaded, and, hence no external access is required, the same pins can be used as traditional FPGA I/O pins.

It is also possible further to reduce the number of I/O pins by splitting the row and column addresses into multiple sub addresses, and by sharing the data and control pins over the same lines. This clearly slows down the access time from the external devices, such as a CPU, but provides even lower pin count, reduced cost, and on-the-fly alterable FPGA in operation.

Simulation Application Implemented with 'SONAL'

As an example, if a fast 32 bit adder, capable of adding two 32 bit numbers in 2 clock cycles is designed for a next generation CPU and the workstation is equipped with 'SONAL' type FPGA operating as coprocessor, then the adder simulation typically will take a few clock cycles. In accordance with the preferred embodiment, the 'SONAL' can be dynamically reconfigured and then the function can be verified by executing the task in real time on such configured 'SONAL'. This compares well against the traditional workstation without 'SONAL' approach, which typically takes thousands of cycles.

Computing Application Implemented with 'SONAL'

Using again for illustrative background purposes, a computing application example where a complex iterative 64 bit multiplication functionality is followed by an addition functionality, if this is to be performed by a 32 bit CPU for 1024 samples, a CPU equipped with 'SONAL' configures it to operate as a function specific unit executing the iterative 64 bit function in a step, thereby substantially improving the machine performance compared to the traditional approach described earlier.

The advantages of such novel FPGA architectures using the invention are therefore, as before indicated, the provision of on-the-fly reconfigurability with architectural innovations rather than sheer device speeds; self modifying capability to allow for efficient high speed pipe-lined implementations; storing a large number of configurations internally to the chip; reducing pin count for the functionality provided, with relatively low cost due to reduction in the number of pins; and providing a system design interface nearly identical to existing FPGA units, thus minimizing the design cycle.

Further modifications will also occur to those skilled in this art including, among others, providing logic to enable high speed serial data loading into the DRAM for networking, multimedia and other applications, and implementing this approach as part of the CPU itself rather than an external device, or applying this external DRAM interface along with internal connectivity for fast reconfigurability to other devices than FPGAs, and such are considered to fall within the spirit and scope of the invention as defined in the appended claims.

What is claimed is:

1. A method of configuring an array of programmable logic cells each having logic functions controlled by an associated configuration bit memory that comprises, storing bit information defining multiple program configurations in a DRAM core; connecting a bus to the array to enable a DRAM row wide loading of the configuration bit memories of the cells with bit information defining a desired configuration; and, upon a configuration command, retrieving from the DRAM core, at least a row at a time, the configuration bit information, and loading such information in the bit memories of the cells to control the corresponding cell logic functions to achieve the desired configuration programming, and in which, upon completion of a function by the array of logic cells, a bit command is generated to indicate a new desired functionality of the array; and a supplemental memory core is provided containing the bit address of a DRAM row and connected to be responsive to the next functionality bit command and correspondingly to drive the DRAM, retrieving and loading the configuration bit information representing said next functionality in the bit memories of the cells, controlling the corresponding cell logic functions and thereby self-reconfiguring the array to perform the next functionality.

2. A method as claimed in claim 1 wherein said self reconfigurability continues automatically for subsequent desired functionality commands.

3. A method as claimed in claim 1 and in which new configuration data is loaded into the DRAM core while the device is operating.

4. A method of configuring an array of programmable logic cells each having logic functions controlled by an associated configuration bit memory, that comprises, storing bit information defining multiple program configurations in a DRAM core; connecting a bus to the array to enable a DRAM row wide loading of the configuration bit memories of the cells with bit information defining a desired configuration; and, upon a configuration command, retrieving from the DRAM core, at least a row at a time, the configuration bit information, and loading such information in the bit memories of the cells to control the corresponding cell logic functions to achieve the desired configuration programming, and in which the DRAM core is also used as storage space accessible from both external I/O interfacing and internal logic.

5. A method as claimed in claim 4 and in which the row-at-a-time retrieval and loading enables re-configuration on-the-fly.

6. A method as claimed in claim 4 and in which the array comprises an FPGA device, and the logic cell bit memories comprise SRAM distributed bits.

7. A method as claimed in claim 6 and in which reconfiguration is effected by loading only those SRAM rows of bits which need to be changed.

8. A method as claimed in claim 4 and in which, during external interfacing, the internal row wide bus stores/retrieves a maximum of row wide data in one access; and, once a row has been internally selected, rapidly accessing column data.

9. Apparatus for configuring an array of programmable logic cells each having logic functions controlled by an associated configuration bit memory, the apparatus having, in combination, a DRAM core for storing bit information defining multiple program configurations; a bus interconnecting the array and the DRAM core such as to enable a DRAM row wide loading of the configuration bit memories of the array of logic cells with bit information defining a desired configuration; means for generating a configuration command; and, upon such configuration command, and responsive thereto, means for retrieving from the DRAM core, at least a row at a time, the configuration bit information; and means for loading such information in said bit memories of the logic cells to control the corresponding cell logic functions to achieve the desired configuration programming, and in which an access control circuit is provided connected to input the DRAM core and connected to one or both of a DRAM arbitration and refresh logic module responsive to a configuration command internally emanating from the array of logic cells, and an external DRAM interface.

10. Apparatus as claimed in claim 9 and in which the array comprise, an FPGA device, and the logic cell bit memories comprise SRAM distributed bits.

11. Apparatus as claimed in claim 10 and in which reconfiguration is effected, wherein the loading means load only those SRAM rows of bits which need to be changed.

12. Apparatus as claimed in claim 9 and in which the array is part of a programmable device and new configuration data is loaded into the DRAM core while the device is operating.

13. Apparatus as claimed in claim 12 and in which the device includes an FPGA.

14. Apparatus as claimed in claim 9 and in which the row-at-a-time retrieval and loading enables re-configuration on-the-fly.

15. Apparatus as claimed in claim 9 and in which two identical banks of DRAMS are provided with identical configuration data loaded into each.

16. Apparatus for configuring an array of programmable logic cells each having logic functions controlled by an associated configuration bit memory, the apparatus having, in combination, a DRAM core for storing the information defining multiple program configurations: a bus interconnecting the array and the DRAM core such as to enable a DRAM row wide loading of the configuration bit memories of the array of logic cells with bit information defining a desired configuration; means for generating a configuration command; and, upon such configuration command, and responsive thereto, means for retrieving from the DRAM core, at least a row at a time, the configuration bit information, and means for loading such information in said bit memories of the logic cells to control the corresponding cell logic functions to achieve the desired configuration programming, and in which an access control circuit is provided connected to input the DRAM core and responsive to data bits corresponding to a DRAM row address emanating from an SRAM memory core unit containing data width equal to the number of bits required to decode DRAM row addresses uniquely, thereby to drive the selected row addresses of the DRAM internally, and with the SRAM unit connected to receive address bit configuration command signals from the array of logic cells.

17. Apparatus as claimed in claim 16 and in which the said configuration command signal is generated upon completion of a function by the array of logic cells, as a new configuration for a next desired functionality of the array; and, upon the designated DRAM row address, correspondingly decoding the DRAM core from the access control means; means for loading the configuration bit information representing said next functionality, as returned from the DRAM core, in the bit memories of the logic cells, thereby to control the corresponding cell logic functions and thus self-reconfiguring the array to perform the next functionality, with said self-reconfiguring continuing automatically for subsequent desired functionality commands.

18. Apparatus as claimed in claim 17 and in which the logic cell array generates 5 address bits and the SRAM unit generates 9 data bits corresponding to a DRAM row address, the SRAM unit containing 32×9 bits.

19. Apparatus for configuring an array of programmable logic cells each having logic functions controlled by an associated configuration bit memory, the apparatus having, in combination, a DRAM core for storing bit information defining multiple program configurations; a bus interconnecting the array and the DRAM core such as to enable a DRAM row wide loading of the configuration bit memories of the array of logic cells with bit information defining a desired configuration; means for generating a configuration command; and, upon such configuration command, and responsive thereto, means for retrieving from the DRAM core, at least a row at a time, the configuration bit information, and means for loading such information in said bit memories of the logic cells to control the corresponding cell logic functions to achieve the desired configuration programming, and in which, the logic cell array, upon completion of a function, generates a bit command to indicate a next desired functionality of the array; and there is further provided a supplemental memory core containing the bit address of a DRAM row and connected between the array and the DRAM core to respond to said next functionality bit command and correspondingly to drive the DRAM to retrieve and load the configuration bit information representing said next functionality in the bit memories of the cells of the array, to control the corresponding cell logic functions, thereby to enable self-reconfiguration of the array to perform said next functionality.

20. Apparatus as claimed in claim 19 and in which the supplemental memory core comprises a SRAM core.

21. Apparatus as claimed in claim 19 and in which said self-reconfiguration continues automatically for subsequent desired functionality commands.

22. Apparatus for configuring an array of programmable logic cells each having logic functions controlled by an associated configuration bit memory, the apparatus having, in combination, a DRAM core for storing bit information defining multiple program configurations; a bus interconnecting the array and the DRAM core such as to enable a DRAM row wide loading of the configuration bit memories of the array of logic cells with bit information defining a desired configuration; means for generating a configuration command; and, upon such configuration command, and responsive thereto, means for retrieving from the DRAM core, at least a row at a time, the configuration bit information; and means for loading such information in said bit memories of the logic cells to control the corresponding cell logic functions to achieve the desired configuration programming, and in which the DRAM core is also used as storage space accessible from both external I/O interfacing and internal logic.

23. Apparatus as claimed in claim 22 and in which, during external interfacing, the internal row wide bus stores/retrieves a maximum of row wide data in one access; and, once a row has been internally selected, means is provided for rapidly accessing column data.

24. Apparatus for configuring an array of programmable logic cells each having logic functions controlled by an associated configuration bit memory, the apparatus having, in combination, a DRAM core for storing bit information defining multiple program configurations; a bus interconnecting the array and the DRAM core such as to enable a DRAM row wide loading of the configuration bit memories of the array of logic cells with bit information defining a desired configuration; means for generating a configuration command; and, upon such configuration command, and responsive thereto, means for retrieving from the DRAM core, at least a row at a time, the configuration bit information; and means for loading such information in said bit memories of the logic cells to control the corresponding cell logic functions to achieve the desired configuration programming, and in which the array comprises an FPGA device, and the logic cell bit memories comprises SRAM distributed bits, and in which two identical banks of DRAMs are provided with identical configuration data loaded into each, and in which when one bank is having its DRAM core(s) refreshed, the other provides the configuration data.

* * * * *